United States Patent
Luo et al.

(10) Patent No.: US 12,238,738 B2
(45) Date of Patent: Feb. 25, 2025

(54) METHOD PERFORMED BY A USER EQUIPMENT. AND USER EQUIPMENT FOR A DOWNLINK CONTROL INFORMATION SIZE ALIGNMENT

(71) Applicant: SHARP KABUSHIKI KAISHA, Sakai (JP)

(72) Inventors: Chao Luo, Shanghai (CN); Renmao Liu, Shanghai (CN); Yinan Zhao, Shanghai (CN); Tomoki Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 347 days.

(21) Appl. No.: 17/797,054

(22) PCT Filed: Feb. 5, 2021

(86) PCT No.: PCT/CN2021/075485
§ 371 (c)(1),
(2) Date: Aug. 2, 2022

(87) PCT Pub. No.: WO2021/160032
PCT Pub. Date: Aug. 19, 2021

(65) Prior Publication Data
US 2023/0079566 A1    Mar. 16, 2023

(30) Foreign Application Priority Data
Feb. 13, 2020   (CN) .......................... 202010091898.3

(51) Int. Cl.
*H04W 72/23* (2023.01)
*H04W 24/08* (2009.01)

(52) U.S. Cl.
CPC .......... *H04W 72/23* (2023.01); *H04W 24/08* (2013.01)

(58) Field of Classification Search
CPC ... H04W 72/23; H04W 24/08; H04W 72/232; H04W 4/40; H04W 28/16; H04L 5/0053
See application file for complete search history.

(56) References Cited

U.S. PATENT DOCUMENTS

| | | | | |
|---|---|---|---|---|
| 2020/0337029 A1* | 10/2020 | Yi | .......................... | H04L 5/0053 |
| 2021/0227517 A1* | 7/2021 | Yi | .......................... | H04W 72/23 |
| 2022/0116143 A1* | 4/2022 | Luo | ....................... | H04L 1/0079 |
| 2022/0124788 A1* | 4/2022 | Kittichokechai | . | H04W 72/1263 |

(Continued)

OTHER PUBLICATIONS

LG Electronics et al., "New WID on 5G V2X with NR sidelink", RP-190766 3GPP TSG RAN Meeting #83, Shenzhen, China, Mar. 18-21, 2019.

(Continued)

*Primary Examiner* — Afshawn M Towfighi
(74) *Attorney, Agent, or Firm* — ScienBiziP, P.C.

(57) ABSTRACT

According to the present invention, a method performed by user equipment and user equipment are provided. The method performed by user equipment is characterized by including: determining a size of one or more DCI formats in a set S of DCI formats; and receiving DCI, wherein the set S of DCI formats includes at least one of DCI format 3_0 and DCI format 3_1, and the UE is configured with at least one of an SL-RNTI, an SL-CS-RNTI, an SL-L-CS-RNTI, and an SL SPS V-RNTI.

2 Claims, 1 Drawing Sheet

(56) References Cited

U.S. PATENT DOCUMENTS

2022/0377785 A1* 11/2022 Yao ................ H04L 1/1822
2023/0079566 A1*  3/2023 Luo ................ H04W 24/08
                                                 370/329

OTHER PUBLICATIONS

NTT Docomo, Inc., "New WID on New Radio Access Technology", RP-170855 3GPP TSG RAN Meeting #75, Dubrovnik, Croatia, Mar. 6-9, 2017.
Huawei et al., "New WID on 3GPP V2X Phase 2", RP-170798 3GPP TSG RAN Meeting #75, Dubrovnik, Croatia, Mar. 6-9, 2017.
LG Electronics et al., "New WI proposal: Support for V2V services based on LTE sidelink", RP-152293 3GPP TSG RAN Meeting #70, Sitges, Spain, Dec. 7-10, 2015.

* cited by examiner

METHOD PERFORMED BY A USER EQUIPMENT, AND USER EQUIPMENT FOR A DOWNLINK CONTROL INFORMATION SIZE ALIGNMENT

TECHNICAL FIELD

The present invention relates to a method performed by user equipment, and user equipment.

BACKGROUND

How to perform size alignment for different DCI formats in 5G is an issue that needs to be addressed.

In addition, in 5G V2X, since new DCI formats (for example, DCI format 3_0, and for another example, DCI format 3_1) are introduced, how to process a size of a new DCI format (for example, whether it is necessary to align the size of the new DCI format with a size of an existing DCI format in 5G, and how to perform alignment) is an issue that needs to be addressed.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY

In order to address at least part of the aforementioned issues, provided in the present invention are a method performed by user equipment, and user equipment. By improving a DCI size alignment procedure, the UE can efficiently and unambiguously determine a size of DCI related to 5G V2X.

According to the present invention, provided is a method performed by user equipment (UE), characterized by comprising:
performing a DCI size alignment procedure for a first set of DCI formats; and
if a first sidelink DCI size alignment condition is met, then performing a first sidelink DCI size padding operation,
wherein:
the first set of DCI formats is a set of DCI formats other than DCI format 3_0 and DCI format 3_1 in a set of DCI formats configured to be monitored by the UE in a cell,
the first sidelink DCI size alignment condition comprises that the UE is configured to monitor DCI format 3_0 or that the UE is configured to monitor DCI format 3_1, and
the first sidelink DCI size padding operation comprises: padding configured DCI format 3_0 or configured DCI format 3_1 with zeros, until DCI format 3_0 or DCI format 3_1 has a payload size equal to the smallest payload size among payload sizes of DCI in the first set of DCI formats larger than DCI format 3_0 or DCI format 3_1.

According to the present invention, provided is a method performed by user equipment, characterized by comprising:

determining a size of one or more DCI formats in a set S of DCI formats; and receiving DCI. Preferably, the set S of DCI formats comprises at least one of DCI format 3_0 and DCI format 3_1.

Preferably, the UE is configured with at least one of an SL-RNTI, an SL-CS-RNTI, an SL-L-CS-RNTI, and an SL SPS V-RNTI.

Preferably, if the UE is configured to monitor DCI format 3_0 and DCI format 3_1, and if the number of information bits of DCI format 3_1 is less than a payload size of DCI format 3_0, then zeros are appended to DCI format 3_1 until a payload size thereof is equal to the payload size of DC format 3_0.

Preferably, if a DCI format 3_0 padding condition is met, then a DCI format 3_0 padding operation is performed.

Preferably, the DCI format 3_0 padding condition is as follows: the UE is configured to monitor DCI format 3_0, and d is not equal to the value of any element in a set $T_{others}$.

Preferably, the DCI format 3_0 padding operation is as follows: append zeros to DCI format 3_0 until the payload size thereof is equal to the value of the smallest element in the set $T_{others}$ larger than d.

Preferably, if the DCI format 3_1 padding condition is met, then the DCI format 3_1 padding operation is performed.

Preferably, the DCI format 3_1 padding condition is as follows: the UE is configured to monitor DCI format 3_1, and d is not equal to the value of any element in the set $T_{others}$.

Preferably, the DCI format 3_1 padding operation is as follows: append zeros to DCI format 3_1 until the payload size thereof is equal to the value of the smallest element in the set $T_{others}$ larger than d.

Preferably, if the UE is configured to monitor DCI format 3_0, then d is a size of DCI format 3_0 before size adjustment.

Preferably, if the UE is not configured to monitor DCI format 3_0, and if the UE is configured to monitor DCI format 3_1, then d is a size of DCI format 3_1 before size adjustment.

Preferably, the set $T_{others}$ is a set of sizes of all DCI formats in the set S of DCI formats other than DCI format 3_0 (if present) and DCI format 3_1 (if present).

In addition, according to the present invention, provided is user equipment, comprising: a processor; and a memory having instructions stored therein, wherein when run by the processor, the instructions perform the aforementioned method.

Therefore, the present invention provides a method that improves a DCI size alignment procedure, such that UE can efficiently and unambiguously determine a size of DCI related to 5G V2X.

BRIEF DESCRIPTION OF THE DRAWINGS

The above and other features of the present invention will be more apparent from the following detailed description in combination with the accompanying drawings, in which.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
AGC: Automatic Gain Control
AL: Aggregation Level
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband, enhanced mobile broadband communication
eNB: E-UTRAN Node B
E-UTRAN: Evolved UMTS Terrestrial Radio Access Network
FDD: Frequency Division Duplex
FDRA: Frequency Domain Resource Assignment
FR1: Frequency Range 1
FR2: Frequency Range 2
GLONASS: GLObal NAvigation Satellite System
gNB: NR Node B
GNSS: Global Navigation Satellite System
GPS: Global Positioning System
HARQ: Hybrid Automatic Repeat Request
ID: Identity (or Identifier)
IE: Information Element
IP: Internet Protocol
LCID: Logical Channel ID, Logical Channel Identifier
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
mMTC: massive Machine Type Communication
NAS: Non-Access Stratum
NDI: New Data Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)

SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel: Sub-channel
SUL: Supplementary Uplink
TA: Timing Advance
TAG: Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "send" may be replaced with "transmit" where applicable.

Optionally, "higher layer" may refer to one or more protocol layers or protocol sub-layers above a physical layer. For example, a MAC layer, an RLC layer, a PDCP layer, a PC5-RRC layer, a PC5-S layer, an RRC layer, a V2X layer, an application layer, a V2X application layer, or the like.

Optionally, "pre-configuration" may be pre-configuration performed by means of a higher-layer protocol/signaling. For example, it is pre-configured in a specific storage location in the UE (for example, it is pre-configured according to the specification of the higher layer protocol), or pre-configured in a specific accessible storage location in the UE (for example, it is pre-configured according to the specification of the higher layer protocol).

Optionally, "configuration" may be configuration performed by means of a higher layer protocol/signaling. For example, it is configured for the UE by means of RRC signaling.

Optionally, a time-domain resource may also be referred to as a time resource.

Optionally, a frequency-domain resource may also be referred to as a frequency resource.

Optionally, "symbol" refers to "OFDM symbol".

Optionally, in one slot, OFDM symbol numbers may start from 0. For example, for a normal CP, a set of OFDM symbol numbers in one slot may be $\{0, 1, \ldots, 13\}$. For another example, for an extended CP, a set of OFDM symbol numbers in one slot may be $\{0, 1, \ldots, 11\}$.

Optionally, the resource block may refer to a virtual resource block (VRB), or may refer to a physical resource block (PRB), or may refer to a common resource block (CRB), or may refer to a resource block defined in other manner.

Optionally, in one resource block, subcarrier numbers may start from 0. For example, a set of subcarrier numbers in one resource block may be $\{0, 1, \ldots, 11\}$.

Optionally, "DCI format" refers to a DCI format in the same serving cell configured for the UE.

Optionally, "size of the DCI format" may also be referred to as a payload size of the DCI format, and vice versa.

Optionally, "size of the DCI format" refers to a size of a corresponding DCI format when the "size of the DCI format" is mentioned. For example, in step a, regarding "if a size of DCI format X is equal to a size of DCI format Y, then appending one zero padding bit to DCI format X", "size of DCI format X" mentioned is a size of DCI format X before one zero padding bit is appended to DCI format X.

In communication based on device to device (D2D) technology, an interface between devices (also referred to as user equipment (UE)) may be referred to as a PC5 interface. A corresponding transmission link on a physical layer may be referred to as a "direct link" or "sidelink" (SL for short) so as to be distinguished from an uplink (UL for short) and a downlink (DL for short). Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL. Hereinafter, "SL" refers to an NR SL unless otherwise specified.

A physical layer of an SL interface can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as $\mu$). For example, $\Delta f=15$ kHz corresponds to $\mu=0$, $\Delta f=30$ kHz corresponds to $\mu=1$, $\Delta f=60$ kHz corresponds to $\mu=2$, $\Delta f=120$ kHz corresponds to $\mu=3$, and so on. For another example, for any given $\mu$, $\Delta f=2^{\mu} \cdot 15$ kHz. $\mu$ may be an SCS configuration of an SL carrier. For example, all SL transmissions in one SL carrier use the same SCS configuration and/or the same CP. $\mu$ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. $\mu$ may be an SCS configuration of a resource pool. For example, all SL transmissions in one resource pool use the same SCS configuration and/or the same CP.

Signals and channels related to an SL operation may include:
an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;

an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;
a PSBCH (physical sidelink broadcast channel);
a PSCCH (physical sidelink control channel);
a PSSCH (physical sidelink shared channel); and
a PSFCH (physical sidelink feedback channel).

The SL PSS, the SL SSS, and the PSBCH may be organized together into a block on a time/frequency resource. The block is referred to as, for example, an SL SSB (sidelink synchronization signal/PSBCH block, or SSS/PSBCH block), or is referred to as an SSS/PSBCH block, or is referred to as an S-SS/PSBCH block, or is referred to as an S-SSB, or is referred to as an SSSB, or is referred to as an SL-SSB, or is referred to as an SSB-SL. A transmission bandwidth (for example, 11 resource blocks) of the SL SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL). The SL MIB may include configuration information of the SL, such as information related to a direct frame number (or referred to as a frame number) or a direct half frame number (or referred to as a half frame number) or a direct subframe number (or referred to as a subframe number) or a direct slot number (or referred to as a slot number) where a PSBCH (or a corresponding SL SSB) carrying the SL MIB is located.

On the SL, a time-domain resource and/or a frequency-domain resource used to transmit the SL SSB may be configured by means of higher-layer parameter(s). For example, in the frequency domain, a location of the SL SSB in the frequency domain may be configured by means of a parameter absoluteFrequencySSB-SL. For another example, in the time domain, in a period having a length of 16 frames, the number of SL SSBs (denoted as, for example, $N_{period}^{S\text{-}SSB}$) may be configured by means of a parameter numSSBwithinPeriod-SL. An index of a slot where an SL SSB having a number (or index) of $i_{S\text{-}SSB}$ ($0 \leq i_{S\text{-}SSB} \leq N_{period}^{S\text{-}SSB}-1$) is located in the period having a length of 16 frames may be $N_{offset}^{S\text{-}SSB}+N_{interval}^{S\text{-}SSB} \cdot i_{S\text{-}SSB}$, wherein $N_{offset}^{S\text{-}SSB}$ may be configured by means of a parameter timeOffsetSSB-SL, and $N_{interval}^{S\text{-}SSB}$ may be configured by means of a parameter $N_{interval}^{S\text{-}SSB}$.

Sometimes, it may be considered that the time-domain resource and/or the frequency-domain resource configured for the SL SSB in the SL carrier corresponds to a candidate SL SSB (or referred to as SL SSB candidate). On a time-domain resource and/or a frequency-domain resource corresponding to one candidate SL SSB, one or more SL SSB transmissions (for example, respectively from different UEs) may exist at the same time, or no SL SSB transmission may exist.

A synchronization source (or referred to as a synchronization reference, or referred to as a synchronization reference source) related to SL synchronization may include a GNSS (global navigation satellite system), a gNB, an eNB, and UE (for example, NR UE, or LTE UE, or NR UE or LTE UE). UE serving as a synchronization source (for example, UE transmitting the SL SSB) may be referred to as SyncRef UE.

Examples of the GNSS may include the GPS (Global Positioning System), the GLONASS (GLObal NAvigation Satellite System), the BeiDou (Beidou Navigation Satellite System), the Galileo (Galileo Navigation Satellite System), the QZSS (Quasi-Zenith Satellite System), etc. One or more (for example, one) SL BWPs may be configured in the SL carrier. In each SL BWP, a starting symbol of an SL time-domain resource in one slot may be configured by means of a parameter startSLsymbols (or a parameter sl-StartSymbol-r16) (for example, the symbol is numbered as $l_{start}^{SL}$ start in one slot), and the number of symbols of the SL time-domain resource in one slot may be configured by means of a parameter lengthSLsymbols (or a parameter sl-LengthSymbols-r16) (for example, the number of symbols is denoted as $N_{length}^{SL}$). The symbol of the SL time-domain resource in one slot may be referred to as "SL symbol". If a set of SL symbols in one slot is denoted as $\{1_1^{SL}, 1_2^{SL}, \ldots, 1_{N_{length}^{SL}}^{SL}\}$, then $1_1^{SL}=l_{start}^{SL}$, $1_2^{SL}=l_{start}^{SL}+1, \ldots, 1_{N_{length}^{SL}}^{SL}=l_{start}^{SL}+N_{length}^{SL}-1\}$. For example, if $l_{start}^{SL}=7$, $N_{length}^{SL}=7$, then the set of SL symbols in one slot is (7, 8, 9, 10, 11, 12, 13). SL transmission may be performed in a specific resource pool. One or more resource pools may be configured in one SL BWP. In each resource pool, in the frequency domain, the location of a starting resource block of a starting sub-channel of the resource pool in the SL BWP may be configured by means of a parameter startRB-Subchannel (or a parameter sl-StartRB-Subchannel-r16).

In the frequency domain, the number (denoted as $N_{subChannel}^{SL}$) of sub-channels occupied by the resource pool may be configured by means of a parameter numSubchannel (or a parameter sl-NumSubchannel-r16). The $N_{subChannel}^{SL}$ subchannels may be consecutive in the frequency domain.

In the frequency domain, each sub-channel may consist of one or more resource blocks, and the specific number of resource blocks (referred to as a size of the sub-channel, for example, denoted as $n_{subChannelSize}$) may be configured by means of a parameter subchannelsize (or a parameter sl-SubchannelSize-r16). The $n_{subChannelSize}$ resource blocks may be consecutive in the frequency domain.

In the frequency domain, in an order from a low frequency to a high frequency, all sub-channels in one resource pool may be respectively numbered as 0, 1, . . . , $N_{subChannel}^{SL}-1$. A sub-channel numbered as i may be referred to as "sub-channel i" ($0 \leq i \leq N_{subChannel}^{SL}-1$).

In the time domain, one or more slots available for the resource pool (or belonging to the resource pool) and appearing periodically may be configured by means of a parameter timeresourcepool (or a parameter sl-TimeResource-r16) (for example, by means of a slot bitmap). A size of the period may be configured by means of a parameter periodResourcePool.

Methods for allocating resources (such as time-domain resources, or frequency-domain resources, or code-domain resources) related to the SL operation may be classified as follows:

Mode 1: a base station schedules SL resources for SL transmission.

Mode 2: UE determines the SL resources for SL transmission (that is, the base station does not participate in scheduling of the SL resources). For example, UE performing an SL transmission operation autonomously determines the SL resources for the SL transmission.

The UE may schedule data transmission by means of sidelink control information (SCI). The SL operation may support "two-stage SCI" wherein $1^{st}$-stage SCI may include information such as resource reservation and/or resource allocation, so that all UEs monitoring the SL can perform sensing with respect to a resource reservation and/or resource allocation status, and $2^{nd}$-stage SCI may include other information, such as information related to HARQ feedback and the like. Hereinafter, unless otherwise specified, when mentioned individually, "SCI" may include only the $1^{st}$-stage SCI, or may include only the $2^{nd}$-stage SCI, or may include both the $1^{st}$-stage SCI and the $2^{nd}$-stage SCI.

A format of the $1^{st}$-stage SCI may be SCI format 0-1 (or written as "SCI format 0_1"). The following are some examples of the information that can be included in SCI format 0-1:
priority;
frequency resource assignment;
time resource assignment;
a resource reservation period; and
a $2^{nd}$-stage SCI format.

A format of the $2^{nd}$-stage SCI may be SCI format 0-2 (or written as "SCI format 0_2"). The following are some examples of the information that can be included in SCI format 0-2:
a source layer-1 identifier (source layer-1 ID, or referred to as layer-1 source ID, or referred to as physical layer source ID, or referred to as source ID (when the context is clear));
a destination layer-1 identifier (destination layer-1 ID, or referred to as layer-1 destination ID, or referred to as physical layer destination ID, or referred to as destination ID (when the context is clear));
an HARQ process identifier (HARQ process ID), or an HARQ process number;
a new data indicator (NDI); and
a redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, a sub-channel where a starting resource block of the PSCCH is located is a starting sub-channel of the PSSCH associated therewith. For another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH).

For a specific SL transmission including a PSCCH and/or a PSSCH, a transmitter may be referred to as TX UE, and a receiver may be referred to as RX UE. If the SL transmission is a groupcast transmission or a unicast transmission, and if HARQ feedback is enabled, a PSFCH transmitted by the RX UE may carry feedback with respect to a PSCCH and/or a PSSCH transmitted by the TX UE. The feedback may be referred to as "HARQ-ACK information". In some configurations, the HARQ-ACK information may be a positive acknowledgement (ACK), or a negative acknowledgement (NACK, or NAK). In some other configurations, the HARQ-ACK information may include only NACK.

In the time domain, PSFCH resources may be configured, for example, by means of a parameter sl-PSFCH-Period-r16, to appear periodically in one resource pool (for example, configured to be one slot, or two slots, or four slots). A special value (for example, 0) of the parameter sl-PSFCH-Period-r16 may be used to indicate that no PSFCH resource is configured in a corresponding resource pool, and/or indicate that HARQ feedback in the corresponding resource pool is disabled. Slots related to a PSFCH period may be "logical slots", that is, only slots belonging to a corresponding resource pool are included. For example, if slot 0 and slot 5 in a certain frame belong to time-domain resources of a certain resource pool, and if slots 1, 2, 3, and 4 do not belong to the time-domain resources of this resource pool, then sl-PSFCH-Period-r16=1 can indicate that PSFCH resources are present in slot 0 and slot 5.

In the frequency domain, PSFCH resources can be configured to be in one RB set (for example, a set of consecutive PRBs, or a set of partially or completely inconsecutive PRBs). For example, it is configured by means of a parameter sl-PSFCH-RB-Set.

On the other hand, in 5G (or referred to as NR, or referred to as 5G NR), downlink transmission on a physical downlink shared channel (PDSCH) and uplink transmission on a physical uplink shared channel (PUSCH) may be scheduled by means of downlink control information (DCI). In 5G V2X, transmission of a PSCCH and a PSSCH may be additionally scheduled by means of DCI.

5G supports multiple DCI formats. For example, the DCI formats shown in Table 1 may be included. CRC of each DCI format may be scrambled by means of a radio-network temporary identifier (RNTI) to indicate a specific purpose and/or one or more destination UEs. For example, CRC of a DCI format for indicating paging may be scrambled by means of a P-RNTI.

TABLE 1

Examples of DCI formats supported by 5G

| DCI format | Purpose |
| --- | --- |
| 0_0 | Scheduling a PUSCH in a cell |
| 0_1 | Scheduling a PUSCH in a cell |
| 0_2 | Scheduling a PUSCH in a cell |
| 1_0 | Scheduling a PDSCH in a cell |
| 1_1 | Scheduling a PDSCH in a cell |
| 1_2 | Scheduling a PDSCH in a cell |
| 2_0 | Notifying a group of UEs of a slot format |
| 2_1 | Notifying a group of UEs of a PRB and an OFDM symbol that can be assumed to be not transmitted |
| 2_2 | Transmitting a transmit power control (TPC) command for a PUCCH and a PUSCH |
| 2_3 | Transmitting a group of TPC commands, and applying the same to SRS transmission of one or more UEs |
| 2_4 | Notifying a group of UEs of a PRB and an OFDM symbol corresponding to canceled UL transmission |
| 3_0 | Scheduling an NR SL in a cell |
| 3_1 | Scheduling an LTE SL in a cell |

In 5G, DCI may be carried on a physical downlink control channel (PDCCH). One PDCCH may consist of one or more control-channel elements (CCEs), and one CCE may consist of a number of (for example, six) resource-element groups (REGs). The REG is defined in a control-resource set (CORESET). One CORESET includes a number of resource blocks (each resource block consists of twelve consecutive subcarriers in the frequency domain) in the frequency domain, and includes one or more (for example, one, or two, or three) OFDM symbols in the time domain.

The UE may monitor PDCCH transmission of abase station on one or more search space sets. Each search space set may correspond to one group of PDCCH candidates. The UE determines, by performing blind detection on time-frequency resources corresponding to PDCCH candidates to be monitored, whether there is a PDCCH being transmitted thereto.

The search space sets can be divided into common search space (CSS) set(s) and UE-specific search space (USS) set(s). For example, specifically, one or more of the following search space sets may be defined:

Type 0—PDCCH CSS set. For example, it is configured by means of a parameter pdcch-ConfigSIB1 in an MIB, or a parameter searchSpaceSIB1 in PDCCH-Config-Common, or a parameter searchSpaceZero in PDCCH-ConfigCommon. An RNTI for scrambling CRC of a corresponding DCI format may include an SI-RNTI. This can be used for a primary cell of a master cell group (MCG).

Type 0A—PDCCH CSS set. For example, it is configured by means of a parameter searchSpaceOtherSystemInformation in PDCCH-ConfigCommon. An RNTI for scrambling CRC of a corresponding DCI format may include an SI-RNTI. This can be used for a primary cell of an MCG.

Type 1—PDCCH CSS set. For example, it is configured by means of a parameter ra-SearchSpace in PDCCH-ConfigCommon. An RNTI for scrambling CRC of a corresponding DCI format may include an RA-RNTI and a TC-RNTI. This can be used for a primary cell.

Type 2—PDCCH CSS set. For example, it is configured by means of a parameter pagingSearchSpace in PDCCH-ConfigCommon. An RNTI for scrambling CRC of a corresponding DCI format may include a P-RNTI. This can be used for a primary cell of an MCG.

Type 3—PDCCH CSS set. For example, it is configured by means of SearchSpace in PDCCH-Config, wherein searchSpaceType=common. An RNTI for scrambling CRC of a corresponding DCI format may include an INT-RNTI, an SFI-RNTI, a TPC-PUSCH-RNTI, a TPC-PUCCH-RNTI, a TPC-SRS-RNTI, a C-RNTI, an MCS-C-RNTI, and a CS-RNTI. The C-RNTI, the MCS-C-RNTI, and the CS-RNTI can be used only for a primary cell.

USS set. For example, it is configured by means of SearchSpace in PDCCH-Config, wherein searchSpaceType=ue-Specic. An RNTI for scrambling CRC of a corresponding DCI format may include a C-RNTI, an MCS-C-RNTI, an SP-CSI-RNTI, a CS-RNTI, an SL-RNTI, an SL-CS-RNTI, and an SL-L-CS-RNTI.

Sometimes, the concept of "search space" can be used. The search space can be associated with a search space set. For example, one search space can be defined as a part of or a subset of one search space set (for example, corresponding to PDCCH candidates having the same aggregation level in one group of PDCCH candidates). For another example, one search space is equivalent to one search space set. For another example, the relationship between a search space and a search space set is defined in another manner.

Since UE monitors DCI in a specific search space, the definition of a "DCI format" can be considered to be related to the search space in which the DCI is monitored. For example, sometimes (for example, upon calculation of the number of DCI sizes that need to be monitored), "DCI format x monitored in search space 1" and "DCI format x monitored in search space 2" can be considered to be two different DCI formats.

Certain restrictions may be imposed on DCI formats that can be monitored in one search space. For example, a UE-specific search space may be configured for monitoring DCI format 0_0 and DCI format 1_0, or may be configured for monitoring DCI format 0_1 and DCI format 1_1, but cannot be configured for monitoring DCI format 0_0, DCI format 1_0, DCI format 0_1, and DCI format 1_1.

Some DCI formats (such as DCI format 3_0, or DCI format 3_1, or the like) are configured to be monitored only in a user-specific search space, and are not configured to be monitored in a common search space. For such a DCI format (denoted as DCI format X), "UE is configured to monitor DCI format X" is equivalent to "UE is configured to monitor DCI format X in a user-specific search space".

UE needs to assume a DCI size when performing blind detection with respect to a PDCCH candidate. Due to limitation of processing capacity, UE can monitor only a certain number of DCI sizes in each slot. For example, the total number of different DCI sizes configured in a cell does not exceed four. For another example, the total number of different DCI sizes configured in the cell and related to a C-RNTI (for example, CRC of a corresponding DCI format is scrambled by the C-RNTI) does not exceed three.

The definition of each field in one DCI format (for example, whether the field is present, a size of the field, and the like) may vary with the RNTI used to scramble the CRC of the DCI format. On the other hand, the DCI format is designed so that when two or more or all applicable RNTIs are respectively used to scramble CRC of one DCI format, sizes of the DCI format are the same. For example, Table 2 and Table 3 respectively show an example of the definition of each field in DCI format 1_0 when the SI-RNTI is used to scramble CRC thereof and an example of the definition of each field in DCI format 1_0 when the RA-RNTI is used to scramble the CRC thereof. It can be seen that sizes of DCI format 1_0 can be uniformly written as $28+d_{FDRA}$ by defining different "reserved bits" field sizes for these two cases, wherein $d_{FDRA}$ is a size of a frequency domain resource assignment field. The value of $d_{FDRA}$ may be related to a search space in which the DCI format is monitored.

The definition of each field in one DCI format may also be related to other pre-defined, configured, or pre-configured information. In order to determine a size of a DCI format (for example, denoted as DCI format X), it is firstly necessary to "determine DCI format X". That is, determination is performed with respect to each field appearing in DCI format X (for example, determination is performed with respect to whether the field is present, a size of the field, and the like) according to pre-defined, pre-configured, or configured information. Optionally, after the "determination of DCI format X", the size of DCI format X may be referred to as "the number of information bits" of DCI format X. Optionally, after any DCI size alignment operation (for example, appending of zero padding bits) is performed on DCI format X, the size of DCI format X is no longer referred to as "the number of information bits" thereof.

In order to minimize the number of total DCI sizes in a cell, the DCI format is designed so that sizes of the same DCI format monitored in two or more common search spaces are the same, and/or sizes of the same DCI format monitored in two or more user-specific search spaces are the same. In this case, optionally, when a size of DCI format x is mentioned, which specific search space is involved can be ignored. For example, this may be "the size of DCI format x monitored in a common search space", and for another example, this may be "the size of DCI format x monitored in a UE-specific search space".

TABLE 2

An example of the definition of DCI format 1_0 when the SI-RNTI is used to scramble CRC thereof

| Field in the DCI format | Size (bits) |
|---|---|
| Frequency domain resource assignment | $\lceil \log_2(N_{RB}^{DL,BWP} (N_{RB}^{DL,BWP} + 1)/2 \rceil$ |
| Time domain resource assignment | 4 |
| VRB-to-PRB mapping | 1 |
| Modulation and coding scheme | 5 |
| Redundancy version | 2 |
| System information indicator | 1 |
| Reserved bits | 15 |

TABLE 3

An example of the definition of DCI format 1_0 when the RA-RNTI is used to scramble the CRC thereof

| Field in the DCI format | Size (bits) |
|---|---|
| Frequency domain resource assignment | $\lceil \log_2(N_{RB}^{DL,BWP} (N_{RB}^{DL,BWP} + 1)/2 \rceil$ |
| Time domain resource assignment | 4 |
| VRB-to-PRB mapping | 1 |
| Modulation and coding scheme | 5 |
| Transport block scaling (TB scaling) | 2 |
| Reserved bits | 16 |

In order to further reduce the total number of DCI sizes in a cell, when necessary, DCI size alignment can be performed. For example, any one or more of the following steps or sub-steps or sub-sub-steps or sub-sub-sub-steps are performed:

Step 0:
Sub-step 0-0:
Determine DCI format 0_0 monitored in a common search space, wherein:
a size of a frequency domain resource assignment field in DCI format 0_0 may be related to $N_{RB}^{UL,BWP}$ (for example, the size of the frequency domain resource assignment field is
$\lceil \log_2(N_{RB}^{UL,BWP} + 1)/2 \rceil$ bits), wherein $N_{RB}^{UL,BWP}$ may be equal to a size of an initial uplink BWP (for example, it is configured by means of a parameter initialUplinkBWP).
Sub-step 0-1:
Determine DCI format 1_0 monitored in a common search space, wherein:
a size of a frequency domain resource assignment field in DCI format 1_0 may be related to $N_{RB}^{DL,BWP}$ (for example, the size of the frequency domain resource assignment field is $[\log_2(N_{RB}^{DL,BWP} + 1)/2)]$ bits). If the cell is configured with CORESET 0, then $N_{RB}^{DL,BWP}$ may be equal to a size of CORESET 0. If the cell is not configured with CORESET 0, then $N_{RB}^{DL,BWP}$ may be equal to a size of an initial downlink BWP (for example, it is configured by means of a parameter initialDownlinkBWP).
Sub-step 0-2:
If DCI format 0_0 is monitored in a common search space, and if the number of information bits of DCI format 0_0 prior to padding is less than a payload size of DCI format 1_0 monitored in a common search space for scheduling the same serving cell, then generate a number of zero padding bits for DCI format 0_0 until a payload size of DCI format 0_0 is equal to the payload size of DCI format 1_0.
Sub-step 0-3:
If DCI format 0_0 is monitored in a common search space, and if the number of information bits of DCI format 0_0 prior to truncation is larger than a payload size of DCI format 1_0 monitored in a common search space for scheduling the same serving cell, then remove, by means of truncation, the first few most significant bits of the frequency domain resource assignment field in DCI format 0_0 to reduce a bit width of the frequency domain resource assignment field, such that the size of DCI format 0_0 is equal to the size of DCI format 1_0.
Step 1:
Sub-step 1-0:
Determine DCI format 0_0 monitored in a UE-specific search space, wherein
a size of a frequency domain resource assignment field in DCI format 0_0 may be related to $N_{RB}^{DL,BWP}$ (for example, the size of the frequency domain resource assignment field is
$[\log_2 (N_{RB}^{UL,BWP} (N_{RB}^{UL,BWP} + 1)/2)]$ bits), wherein $N_{RB}^{UL,BWP}$ may be equal to a size of an active uplink BWP (active UL BWP).
Sub-step 1-1:
Determine DCI format 1_0 monitored in a UE-specific search space, wherein.
a size of a frequency domain resource assignment field in DCI format 1_0 may be related to $(N_{RB}^{DL,BWP}$ (for example, the size of the frequency domain resource assignment field is
$[\log_2 (N_{RB}^{DL,BWP} (N_{RB}^{DL,BWP} + 1)/2)]$ bits), wherein $N_{RB}^{DL,BWP}$ may be equal to a size of an active downlink BWP (active DL BWP).
Sub-step 1-2:
If the UE is configured with an SUL (for example, it is configured by means of supplementary Uplink in ServingCellConfig), and if PUSCH is configured to be transmitted on both the SUL and the non-SUL in the cell, and if the number of information bits of DCI format 0_0 monitored in a UE-specific search space and configured for the SUL is not equal to the number of information bits of DCI format 0_0 monitored in a UE-specific search space and configured for the non-S UL, then generate a number of zero padding bits for DCI format 0_0 having less information bits until a payload size thereof is equal to a payload size of DCI format 0_0 having more information bits.
Sub-step 1-3:
If DCI format 0_0 is monitored in a UE-specific search space, and if the number of information bits of DCI format 0_0 prior to padding is less than a payload size of DCI format 1_0 monitored in a UE-specific search space for scheduling the same serving cell, then generate a number of zero padding bits for DCI format 0_0 until a payload size thereof is equal to the payload size of DCI format 1_0.

Sub-step 1-4:
If DCI format 1_0 is monitored in a UE-specific search space, and if the number of information bits of DCI format 1_0 prior to padding is less than a payload size of DCI format 0_0 monitored in a UE-specific search space for scheduling the same serving cell, then append zeros to DCI format 1_0 (for example, append a number of zero padding bits to the last field of DCI format 1_0) until a payload size thereof is equal to the payload size of DCI format 0_0.

Step 2:

Sub-step 2-0:
Determine DCI format 0_1 monitored in a UE-specific search space, wherein a size of a frequency domain resource assignment field in DCI format 0_1 may be related to $N_{RB}^{UL,BWP}$ (for example, the size of the frequency domain resource assignment field is $[\log_2 (N_{RB}^{UL,BWP} (N_{RB}^{UL,BWP} + 1)/2)]$ bits), wherein $N_{RB}^{UL,BWP}$ may be equal to a size of an active uplink BWP (active UL BWP).

Sub-step 2-1:
Determine DCI format 1_1 monitored in a UE-specific search space, wherein a size of a frequency domain resource assignment field in DCI format 1_1 may be related to $N_{RB}^{DL,BWP}$ (for example, the size of the frequency domain resource assignment field is $[\log_2 (N_{RB}^{DL,BWP} (N_{RB}^{DL,BWP} + 1)/2)]$ bits), wherein $N_{RB}^{DL,BWP}$ may be equal to a size of an active downlink BWP (active DL BWP).

Sub-step 2-2:
If the UE is configured with an SUL (for example, it is configured by means of supplementaryUplink in ServingCellConfig), if a PUSCH is configured to be transmitted on both the SUL and a non-SUL in the cell, and if the number of information bits of DCI format 0_1 monitored in a UE-specific search space and configured for the SUL is not equal to the number of information bits of DCI format 0_1 monitored in a UE-specific search space and configured for the non-SUL, then generate a number of zero padding bits for DCI format 0_1 having less information bits until a payload size thereof is equal to a payload size of DCI format 0_1 having more information bits.

Sub-step 2-3:
If a size of DCI format 0_1 monitored in a UE-specific search space is equal to a size of DCI format 0_0/1_0 monitored in another UE-specific search space, then append one zero padding bit to DCI format 0_1 (for example, append one zero padding bit to the last field of DCI format 0_1).

Sub-step 2-4:
If a size of DCI format 1_1 monitored in one UE-specific search space is equal to a size of DCI format 0_0/1_0 monitored in another UE-specific search space, then append one zero padding bit to DCI format 1_1 (for example, append one zero padding bit to the last field of DCI format 1_1)

Step 2A:

Sub-step 2A-0:
Determine DCI format 0_2 monitored in a UE-specific search space, wherein a size of a frequency domain resource assignment field in DCI format 0_2 may be related to $N_{RB}^{UL,BWP}$ (for example, the size of the frequency domain resource assignment field is $[\log_2 (N_{RB}^{UL,BWP} (N_{RB}^{UL,BWP} + 1)/2)]$ bits), wherein $N_{RB}^{UL,BWP}$ may be equal to a size of an active uplink BWP (active UL BWP).

Sub-step 2A-1:
Determine DCI format 1_2 monitored in a UE-specific search space, wherein a size of a frequency domain resource assignment field in DCI format 1_2 may be related to $N_{RB}^{UL,BWP}$ (for example, the size of the frequency domain resource assignment field is $[\log_2 (N_{RB}^{UL,BWP} (N_{RB}^{UL,BWP} + 1)/2)]$ bits), wherein $N_{RB}^{DL,BWP}$ may be equal to a size of an active downlink BWP (active DL BWP).

Sub-step 2A-2:
If the UE is configured with an SUL (for example, it is configured by means of supplementaryUplink in ServingCellConfig), if PUSCH is configured to be transmitted on both the SUL and a non-SUL in the cell, and if the number of information bits of DCI format 0_2 monitored in a UE-specific search space and configured for the SUL is not equal to the number of information bits of DCI format 0_2 monitored in a UE-specific search space and configured for the non-SUL, then generate a number of zero padding bits for DCI format 0_2 having less information bits until a payload size thereof is equal to a pay load size of DCI format 0_2 having more information bits.

Sub-step 2A-3:
If a size of DCI format 0_2 monitored in a UE-specific search space is equal to a size of DCI format 0_0/1_0 monitored in another UE-specific search space, then append one zero padding bit to DCI format 0_2 (for example, append one zero padding bit to the last field of DCI format 0_2).

Sub-step 2A-4:
If a size of DCI format 1_2 monitored in a UE-specific search space is equal to a size of DCI format 0_0/1_0 monitored in another UE-specific search space, then append one zero padding bit to DCI format 1_2 (for example, append one zero padding bit to the last field of DCI format 1_2).

Step 3:

Sub-step 3-0:
If the following two conditions are both met, then the DCI size alignment procedure is ended:
The total number of different DCI sizes configured in the cell does not exceed four.
The total number of different DCI sizes configured in the cell and related to a C-RNTI (for example, CRC of a corresponding DCI format is scrambled by the C-RNTI) does not exceed three.

-continued

Step 4:
Otherwise,
Sub-step 4A:
Sub-sub-step 4A-0:
Remove a padding bit set P1, wherein the "padding bit set P1" may include any one or more of the following:
The padding bit (if any) added in step 2.
The padding bit (if any) added in step 2-2.
The padding bit (if any) added in step 2-3.
The padding bit (if any) added in step 2-4.
The padding bit (if any) added in step 2A.
The padding bit (if any) added in step 2A-2.
The padding bit (if any) added in step 2A-3.
The padding bit (if any) added in step 2A-4.
Sub-sub-step 4A-1:
If the UE is configured with an SUL (for example, it is configured by means of supplementaryUplink in ServingCellConfig), if PUSCH is configured to be transmitted on both the SUL and a non-SUL in the cell, and if the number of information bits of DCI format 0_1 monitored in a UE-specific search space and configured for the SUL is not equal to the number of information bits of DCI format 0_1 monitored in a UE-specific search space and configured for the non-SUL, then generate a number of zero padding bits for DCI format 0_1 having less information bits until a payload size thereof is equal to a payload size of DCI format 0_1 having more information bits.
Sub-sub-step 4A-2:
If the UE is configured with an SUL (for example, it is configured by means of supplementaryUplink in ServingCellConfig), if PUSCH is configured to be transmitted on both the SUL and a non-SUL in the cell, and if the number of information bits of DCI format 0_2 monitored in a UE-specific search space and configured for the SUL is not equal to the number of information bits of DCI format 0_2 monitored in a UE-specific search space and configured for the non-SUL, then generate a number of zero padding bits for DCI format 0_2 having less information bits until a payload size thereof is equal to a payload size of DCI format 0_2 having more information bits.
Sub-sub-step 4A-3:
Determine DCI format 1_0 monitored in a UE-specific search space, wherein:
a size of a frequency domain resource assignment field in DCI format 1_0 may be related to $N_{RB}^{DL,BWP}$ (for example, the size of the frequency domain resource assignment field is $[\log_2 (N_{RB}^{DL,BWP} (N_{RB}^{DL,BWP} + 1)/2)]$ bits). If the cell is configured with CORESET 0, then $N_{RB}^{DL,BWP}$ may be equal to a size of CORESET 0. If the cell is not configured with CORESET 0, then $N_{RB}^{DL,BWP}$ may be equal to a size of an initial downlink BWP (for example, it is configured by means of a parameter initialDownlinkBWP).
Sub-sub-step 4A-4:
Determine DCI format 0_0 monitored in a UE-specific search space, wherein:
a size of a frequency domain resource assignment field in DCI format 0_0 may be related to $N_{RB}^{UL,BWP}$ (for example, the size of the frequency domain resource assignment field is $[\log_2 (N_{RB}^{UL,BWP} (N_{RB}^{UL,BWP} + 1)/2)]$ bits), wherein $N_{RB}^{UL,BWP}$ may be equal to a size of an initial uplink BWP (for example, it is configured by means of a parameter initialUplinkBWP).
Sub-sub-step 4A-5:
If the number of information bits of DCI format 0_0 monitored in a UE-specific search space prior to padding is less than a payload size of DCI format 1_0 monitored in a UE-specific search space for scheduling the same serving cell, then generate a number of zero padding bits for DCI format 0_0 until a payload size of DCI format 0_0 is equal to the payload size of DCI format 1_0.
Sub-sub-step 4A-6:
If the number of information bits of DCI format 0_0 monitored in a UE-specific search space prior to truncation is larger than a payload size of DCI format 1_0 monitored in a UE-specific search space for scheduling the same serving cell, then remove, by means of truncation, the first few most significant bits of the frequency domain resource assignment field in DCI format 0_0 to reduce a bit width of the frequency domain resource assignment field, such that the size of DCI format 0_0 is equal to the size of DCI format 1_0.
Sub-step 4B:
Sub-sub-step 4B-0:
If the total number of different DCI sizes configured in the cell exceeds four after the above steps have been performed, or if the total number of different DCI sizes related to the C-RNTI and configured in the cell exceeds three after the above steps have been performed,
Sub-sub-sub-step 4B-0-0:
If the number of information bits of DCI format 0_2 prior to padding is less than a payload size of DCI format 1_2 for scheduling the same serving cell, then generate a number of zero padding bits for DCI format 0_2 until a payload size of DCI format 0_2 is equal to the payload size of DCI format 1_2.
Sub-sub-sub-step 4B-0-1:
If the number of information bits of DCI format 1_2 prior to padding is less than a payload size of DCI format 0_2 for used scheduling the same serving cell, then generate a number of zero padding bits for DCI format 1_2 until a payload size of DCI format 1_2 is equal to the payload size of DCI format 0_2.
Sub-step 4C:
Sub-sub-step 4C-0:
If the total number of different DCI sizes configured in the cell exceeds four after the above steps have been performed, or if the total number of different DCI sizes related to the C-RNTI and configured in the cell exceeds three after the above steps have been performed, -continued Sub-sub-sub-step 4C-0-0:
If the number of information bits of DCI format 0_1 prior to padding is less than a payload size of DCI format 1_1 for scheduling the same serving cell, then generate a number of zero padding bits for DCI format 0_1 until a payload size of DCI format 0_1 is equal to the payload size of DCI format 1_1.
Sub-sub-sub-step 4C-0-1:
If the number of information bits of DCI format 1_1 prior to padding is less than a payload size of DCI format 0_1 for scheduling the same serving cell, then generate a number of zero padding bits for DCI format 1_1 until a payload size of DCI format 1_1 is equal to the payload size of DCI format 0_1.

wherein:

Optionally, step 0 includes sub-step 0-0, sub-step 0-1, sub-step 0-2, and sub-step 0-3.

Optionally, step 1 includes sub-step 1-0, sub-step 1-1, sub-step 1-2, sub-step 1-3, and sub-step 1-4.

Optionally, step 2 includes sub-step 2-0, sub-step 2-1, sub-step 2-2, sub-step 2-3, and sub-step 2-4.

Optionally, step 2A includes sub-step 2A-0, sub-step 2A-1, sub-step 2A-2, sub-step 2A-3, and sub-step 2A-4.

Optionally, step 3 includes sub-step 3-0.

Optionally, step 4 includes sub-step 4A, sub-step 4B, and sub-step 4C:

Optionally, sub-step 4A includes sub-sub-step 4A-0, sub-sub-step 4A-1, sub-sub-step 4A-2, sub-sub-step 4A-3, sub-sub-step 4A-4, and sub-sub-step 4A-5.

Optionally, sub-step 4B includes sub-sub-step 4B-0:

Optionally, sub-sub-step 4B-0 includes sub-sub-sub-step 4B-0-0 and sub-sub-sub-step 4B-0-1.

Optionally, sub-step 4C includes sub-sub-step 4C-0:

Optionally, sub-sub-step 4C-0 includes sub-sub-sub-step 4C-0-0 and sub-sub-sub-step 4C-0-1.

Optionally, the execution order of each step or sub-step or sub-sub-step or sub-sub-sub-step can be adjusted. For example, sub-step 4A-1 can be adjusted to be arranged after any sub-step or sub-sub-step or sub-sub-sub-step included in step 4, and for another example, sub-step 4A-2 can be adjusted to be arranged after any sub-step or sub-sub-step or sub-sub-sub-step included in step 4.

Optionally, sub-sub-step 4A-1 may be described as "repeat sub-step 2-2".

Optionally, sub-sub-step 4A-2 may be described as "repeat sub-step 2A-2".

Embodiment 1

A method performed by user equipment according to Embodiment 1 of the present invention will be described below with reference to FIG. 1.

Figure 1:
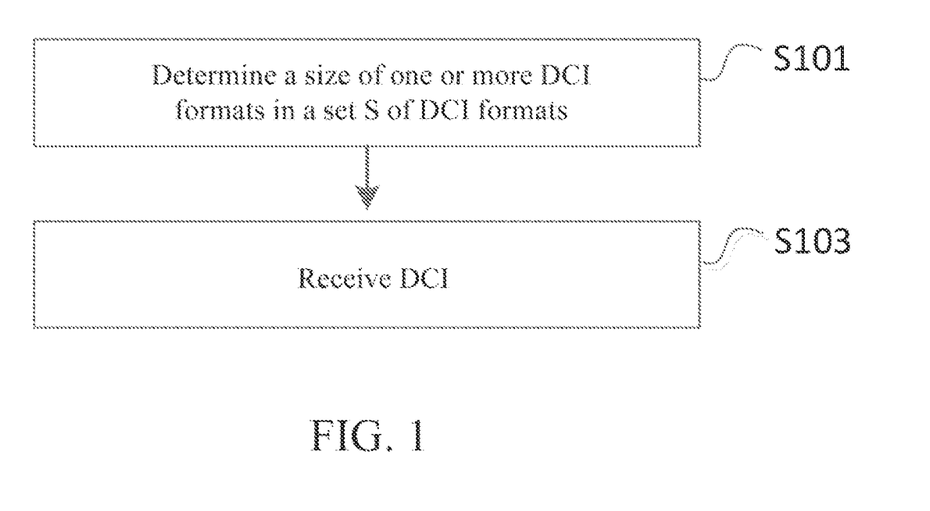
FIG. 1 is a flowchart showing a method performed by user equipment according to Embodiment 1 of the present invention.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, a size of one or more DCI formats in a set S of DCI formats is determined, wherein:

Optionally, the set S of DCI formats includes all DCI formats configured to be monitored by the UE, wherein:

Optionally, all DCI formats configured to be monitored by the UE include at least one of DCI format 3_0 and DCI format 3_1.

Optionally, the set S of DCI formats includes at least one of DCI format 3_0 and DCI format 3_1.

Optionally, the set S of DCI formats includes only DCI formats configured to be monitored by the UE. For example, if the UE is not configured to monitor DCI format 3_1, then the set S of DCI formats does not include DCI format 3_1.

Optionally, the set S of DCI formats includes any one or more of the following DCI formats:

DCI format 0_0.
DCI format 0_1.
DCI format 0_2.
DCI format 1_0.
DCI format 1_1.
DCI format 1_2.
DCI format 2_0.
DCI format 2_1.
DCI format 2_2.
DCI format 2_3.
DCI format 2_4.
DCI format 3_0.
DCI format 3_1.

Optionally, one or more DCI formats in the set S of DCI formats are configured to be monitored in a common search space.

Optionally, one or more DCI formats in the set S of DCI formats are configured to be monitored in a user-specific search space.

Optionally, one or more DCI formats in the set S of DCI formats are configured to be monitored in a common search space, and are also configured to be monitored in a user-specific search space, wherein:

Optionally, if a DCI format (denoted as, for example, DCI format X) is configured to be monitored in a common search space and is also configured to be monitored in a user-specific search space, then DCI format X monitored in the common search space and DCI format X monitored in the user-specific search space may be considered to be two different DCI formats (for example, at least from the perspective of calculation of a size of the DCI format).

Optionally, for a DCI format (denoted as, for example, DCI format X) in the set S of DCI formats, if a "DCI format X monitoring condition" is met, then it may be determined that the UE is configured to monitor DCI format X.

For example, optionally, a "DCI format 3_0 monitoring condition" may include any one or more of the following (in any combination of "and" or "or" when applicable):

The UE is configured with configuration information of SL communication for network scheduling.
The UE is configured with a value of SL-RNTI.
The UE is configured with a value of SL-CS-RNTI.

A set of DCI formats configured in one or more search spaces (or one or more search space sets) configured for the UE includes DCI format 3_0 (for example, the value of a parameter dci-FormatsSL-r16 is "formats3-0", and for another example, the value of a parameter dci-FormatsSL-r16 is "formats3-0-And-3-1").

For another example, optionally, a "DCI format 3_1 monitoring condition" may include any one or more of the following (in any combination of "and" or "or" when applicable):

The UE is configured with configuration information of SL communication for network scheduling.

The UE is configured with a value of SL-L-CS-RNTI.

The UE is configured with a value of SL semi-persistent scheduling V-RNTI (or referred to as SL SPS V-RNTI).

A set of DCI formats configured in one or more search spaces (or one or more search space sets) configured for the UE includes DCI format 3_1 (for example, the value of a parameter dci-FormatsSL-r16 is "formats3-1", and for another example, the value of a parameter dci-FormatsSL-r16 is "formats3-0-And-3-1").

Optionally, the "determining a size of one or more DCI formats in a set S of DCI formats" includes any one or more of the following:

Step 0, or one or more sub-steps of step 0.
Step 1, or one or more sub-steps of step 1.
Step 2, or one or more sub-steps of step 2.
Step 2A, or one or more sub-steps of step 2A.
Step 3, or one or more sub-steps of step 3.
Step 4, or one or more sub-steps of step 4.

Optionally, each sub-step includes one or more sub-sub-steps, wherein:

Optionally, each sub-sub-step includes one or more sub-sub-sub-steps.

Step S101-0: if DCI format 3_1 padding condition 1 is met, then perform DCI format 3_1 padding operation 1, wherein:

Optionally, the "DCI format 3_1 padding condition 1" may be "none", that is, the "DCI format 3_1 padding operation 1" is always performed.

Optionally, the "DCI format 3_1 padding condition 1" may include any one or more of the following (in any combination of "and" or "or" when applicable):

The UE is configured to monitor DCI format 3_0.
The UE is configured to monitor DCI format 3_0 in a user-specific search space.
The UE is configured to monitor DCI format 3_1.
The UE is configured to monitor DCI format 3_1 in a user-specific search space.
The UE is configured to monitor DCI format 3_0 and/or DCI format 3_1.
The number of information bits of DCI format 3_1 is less than the number of information bits of DCI format 3_0.
The number of information bits of DCI format 3_1 is less than a payload size of DCI format 3_0.
The payload size of DCI format 3_1 is less than the payload size of DCI format 3_0.

Optionally, the "DCI format 3_1 padding operation 1" may include: appending zeros to DCI format 3_1 (for example, appending a number of zero padding bits to the last field of DCI format 3_1) until the payload size thereof is equal to the payload size of DCI format 3_0.

Step S101-1: if DCI format 3_0 padding condition 1 is met, then perform DCI format 3_0 padding operation 1, wherein:

Optionally, the "DCI format 3_0 padding condition 1" may be "none", that is, the "DCI format 3_0 padding operation 1" is always performed.

Optionally, the "DCI format 3_0 padding condition 1" may include any one or more of the following (in any combination of "and" or "or" when applicable):

The UE is configured to monitor DCI format 3_0.
The UE is configured to monitor DCI format 3_0 in a user-specific search space.
The UE is configured to monitor DCI format 3_1.
The UE is configured to monitor DCI format 3_1 in a user-specific search space.
The UE is configured to monitor DCI format 3_0 and/or DCI format 3_1.
The number of information bits of DCI format 3_0 is less than the number of information bits of DCI format 3_1.
The number of information bits of DCI format 3_0 is less than a payload size of DCI format 3_1.
The payload size of DCI format 3_0 is less than the payload size of DCI format 3_1.

Optionally, the "DCI format 3_0 padding operation 1" may include: appending zeros to DCI format 3_0 (for example, appending a number of zero padding bits to the last field of DCI format 3_0) until the payload size thereof is equal to the payload size of DCI format 3_1.

Step S101-2: if DCI format 3_0 padding condition 2 is met, then perform DCI format 3_0 padding operation 2. wherein:

Optionally, the "DCI format 3_0 padding condition 2" may be "none", that is, the "DCI format 3_0 padding operation 2" is always performed.

Optionally, the "DCI format 3_0 padding condition 2" may include any one or more of the following (in any combination of "and" or "or" when applicable):

The UE is configured to monitor DCI format 3_0.
The UE is configured to monitor DCI format 3_0 in a user-specific search space.
The UE is configured to monitor DCI format 3_1.
The UE is configured to monitor DCI format 3_1 in a user-specific search space.
The UE is not configured to monitor DCI format 3_1.
The UE is configured to monitor DCI format 3_0 and/or DCI format 3_1.
$d_{1012}$ is not equal to the value of any element in a set $T_{others}$.
$d_{1012}$ is less than the value of an element having the largest value in the set $T_{others}$.

Optionally, the "DCI format 3_0 padding operation 2" may include any one or more of the following:

Appending zeros to DCI format 3_0 (for example, appending a number of zero padding bits to the last field of DCI format 3_0) until the payload size thereof is equal to the value of the smallest element in the set $T_{others}$ larger than $d_{1012}$.

Appending zeros to DCI format 3_0 (for example, appending a number of zero padding bits to the last field of DCI format 3_0) until the payload size thereof is equal to the value of the largest element in the set $T_{others}$.

Optionally, $d_{1012}$ may be determined according to any one or more of the following:

If the UE is configured to monitor DCI format 3_0, and if the UE is configured to monitor DCI format 3_1, then $d_{1012}=\max(D_{30}, D_{31})$.

If the UE is configured to monitor DCI format 3_0, and if the UE is configured to monitor DCI format 3_1, then $d_{1012}=D_{30}$.

If the UE is configured to monitor DCI format 3_0, and if the UE is configured to monitor DCI format 3_1, then $d_{1012}=D_{31}$.

If the UE is configured to monitor DCI format 3_0, and if the UE is not configured to monitor DCI format 3_1, then $d_{012}=D_{30}$.

If the UE is configured to monitor DCI format 3_0, then $d_{1012}=D_{30}$.

If the UE is configured to monitor DCI format 3_0, then $d_{1012}=D_{31}$.

$d_{1012}=D_{30}$.

$d_{1012}=D_{31}$.

$d_{1012}=D_{3031}$.

Step S101-3: if DCI format 3_1 padding condition 2 is met, then perform DCI format 3_1 padding operation 2, wherein:

Optionally, the "DCI format 3_1 padding condition 2" may be "none", that is, the "DCI format 3_1 padding operation 2" is always performed.

Optionally, the "DCI format 3_1 padding condition 2" may include any one or more of the following (in any combination of "and" or "or" when applicable):

The UE is configured to monitor DCI format 3_0.

The UE is configured to monitor DCI format 3_0 in a user-specific search space.

The UE is not configured to monitor DCI format 3_0.

The UE is configured to monitor DCI format 3_1.

The UE is configured to monitor DCI format 3_1 in a user-specific search space.

The UE is configured to monitor DCI format 3_0 and/or DCI format 3_1.

$d_{1013}$ is not equal to the value of any element in a set $T_{others}$.

$d_{1013}$ is less than the value of an element having the largest value in the set $T_{others}$.

Optionally, the "DCI format 3_1 padding operation 2" may include any one or more of the following:

Appending zeros to DCI format 3_1 (for example, appending a number of zero padding bits to the last field of DCI format 3_1) until the payload size thereof is equal to the value of the smallest element in the set $T_{others}$ larger than $d_{1013}$.

Appending zeros to DCI format 3_1 (for example, appending a number of zero padding bits to the last field of DCI format 3_1) until the payload size thereof is equal to the value of the largest element in the set $T_{others}$.

Optionally, $d_{1013}$ may be determined according to any one or more of the following:

If the UE is configured to monitor DCI format 3_1, and if the UE is configured to monitor DCI format 3_0, then $d_{1013}=\max(D_{31}, D_{30})$.

If the UE is configured to monitor DCI format 3_1, and if the UE is configured to monitor DCI format 3_0, then $d_{1013}=D_{31}$.

If the UE is configured to monitor DCI format 3_1, and if the UE is configured to monitor DCI format 3_0, then $d_{1013}=D_{30}$.

If the UE is configured to monitor DCI format 3_1, and if the UE is not configured to monitor DCI format 3_0, then $d_{1013}=D_{31}$.

If the UE is configured to monitor DCI format 3_1, then $d_{1013}=D_{31}$.

If the UE is configured to monitor DCI format 3_1, then $d_{1013}=D_{30}$.

$d_{1013}=D_{31}$.

$d_{1013}=D_{30}$.

$d_{1013}=D_{3031}$.

Step S101-4: if DCI format 3_0/3_1 padding condition 1 is met, then perform DCI format 3_0/3_1 padding operation 1. wherein:

Optionally, the "DCI format 3_0/3_1 padding condition 1" may be "none", that is, the "DCI format 3_0 padding operation 1" is always performed.

Optionally, the "DCI format 3_0/3_1 padding condition 1" may include any one or more of the following (in any combination of "and" or "or" when applicable):

The UE is configured to monitor DCI format 3_0.

The UE is configured to monitor DCI format 3_0 in a user-specific search space.

The UE is not configured to monitor DCI format 3_0.

The UE is configured to monitor DCI format 3_1.

The UE is configured to monitor DCI format 3_1 in a user-specific search space.

The UE is not configured to monitor DCI format 3_1.

The UE is configured to monitor DCI format 3_0 and/or DCI format 3_1.

$d_{1014}$ is not equal to the value of any element in a set $T_{others}$.

$d_{1014}$ is less than the value of an element having the largest value in the set $T_{others}$.

Optionally, the "DCI format 3_0/3_1 padding operation 1" may include any one or more of the following:

Appending zeros to DCI format 3_0 (for example, appending a number of zero padding bits to the last field of DCI format 3_0) until the payload size thereof is equal to the value of the smallest element in the set $T_{others}$ larger than $d_{1014}$.

Appending zeros to DCI format 3_0 (for example, appending a number of zero padding bits to the last field of DCI format 3_0) until the payload size thereof is equal to the value of the largest element in the set $T_{others}$.

Appending zeros to DCI format 3_1 (for example, appending a number of zero padding bits to the last field of DCI format 3_1) until the payload size thereof is equal to the value of the smallest element in the set $T_{others}$ larger than $d_{1014}$.

Appending zeros to DCI format 3_1 (for example, appending a number of zero padding bits to the last field of DCI format 3_1) until the payload size thereof is equal to the value of the largest element in the set $T_{others}$.

Optionally, $d_{1014}$ may be determined according to any one or more of the following:

If the UE is configured to monitor DCI format 3_0, and if the UE is configured to monitor DCI format 3_1, then $d_{1014}=\max(D_{30}, D_{31})$.

If the UE is configured to monitor DCI format 3_0, and if the UE is configured to monitor DCI format 3_1, then $d_{1014}=D_{30}$.

If the UE is configured to monitor DCI format 3_0, and if the UE is configured to monitor DCI format 3_1, then $d_{1014}=D_{31}$.

If the UE is configured to monitor DCI format 3_0, and if the UE is not configured to monitor DCI format 3_1, then $d_{1014}=D_{30}$.

If the UE is not configured to monitor DCI format 3_0, and if the UE is configured to monitor DCI format 3_1, then $d_{1014}=D_{31}$.

If the UE is configured to monitor DCI format 3_0, then $d_{1014}=D_{30}$.
If the UE is configured to monitor DCI format 3_1, then $d_{1014}=D_{31}$.
$d_{1014}=D_{30}$.
$d_{1014}=D_{31}$.
$d_{1014}=D_{3031}$.
wherein:
Optionally, $T_{others}$, is a set of sizes of "other DCI formats", wherein:
Optionally, the "other DCI formats" can be defined in any one of the following manners:
DCI formats other than DCI format 3_0 (if DCI format 3_0 is included in the set S of DCI formats) and DCI format 3_1 (if DCI format 3_1 is included in the set S of DCI formats) in the set S of DCI formats.
DCI formats other than DCI format 3_0 (if DCI format 3_0 is included in the set S of DCI formats) and DCI format 3_1 (if DCI format 3_1 is included in the set S of DCI formats) and related to the C-RNTI in the set S of DCI formats.
DCI formats other than DCI format 3_0 and DCI format 3_1 in the set S of DCI formats.
DCI formats other than DCI format 3_0 and DCI format 3_1 and related to the C-RNTI in the set S of DCI formats.
DCI formats related to the C-RNTI in the set S of DCI formats.
DCI formats other than DCI format 3_0 (if the UE is configured to monitor DCI format 3_0) and DCI format 3_1 (if the UE is configured to monitor DCI format 3_1, for example, if the UE is configured to monitor DCI format 3_1 in a user-specific search space) in the DCI formats configured to be monitored by the UE.
DCI formats other than DCI format 3_0 (if the UE is configured to monitor DCI format 3_0) and DCI format 3_1 (if the UE is configured to monitor DCI format 3_1, for example, the UE is configured to monitor DCI format 3_1 in a user-specific search space) and related to the C-RNTI in the DCI formats configured to be monitored by the UE.
DCI formats other than DCI format 3_0 and DCI format 3_1 in the DCI formats configured to be monitored by the UE.
DCI formats other than DCI format 3_0 and DCI format 3_1 and related to the C-RNTI in the DCI formats configured to be monitored by the UE.
DCI formats related to the C-RNTI in the DCI formats configured to be monitored by the UE.
DCI formats other than DCI format 3_0 and DCI format 3_1.
DCI formats other than DCI format 3_0 and DCI format 3_1 and related to the C-RNTI.
DCI formats related to the C-RNTI.
Optionally, due to a DCI format alignment operation, a size of one or more DCI formats in the "other DCI formats" may vary in different steps (or sub-steps, or sub-sub-steps, or sub-sub-sub-steps). Therefore, $T_{others}$, may vary in different steps (or sub-steps, or sub-sub-steps, or sub-sub-sub-steps).
Optionally, $D_{30}$ is the size of DCI format 3_0, wherein:
Optionally, due to a DCI format alignment operation, $D_{30}$ may vary in different steps (or sub-steps, or sub-sub-steps, or sub-sub-sub-steps).
Optionally, $D_{30}$ exists only if the UE is configured to monitor DCI format 3_0.
Optionally, $D_{31}$ is the size of DCI format 3_1, wherein:
Optionally, due to a DCI format alignment operation, $D_{31}$ may vary in different steps (or sub-steps, or sub-sub-steps, or sub-sub-sub-steps).
Optionally, $D_{31}$ exists only if the UE is configured to monitor DCI format 3_1.
Optionally, $D_{3031}$ is the size of DCI format 3_0/3_1, wherein:
Optionally, if the UE is configured to monitor DCI format 3_0, and if the UE is configured to monitor DCI format 3_1, then the "size of DCI format 3_0/3_1" refers to a common size of DCI format 3_0 and DCI format 3_1 (for example, after step S101-0 is performed, and for another example, after step S101-1 is performed).
Optionally, if the UE is configured to monitor DCI format 3_0, and if the UE is configured to monitor DCI format 3_1, then the "size of DCI format 3_0/3_1" refers to a larger one of the size of DCI format 3_0 and the size of DCI format 3_1.
Optionally, if the UE is configured to monitor DCI format 3_0, and if the UE is not configured to monitor DCI format 3_1, then the "size of DCI format 3_0/3_1" refers to the size of DCI format 3_0.
Optionally, if the UE is not configured to monitor DCI format 3_0, and if the UE is configured to monitor DCI format 3_1, then the "size of DCI format 3_0/3_1" refers to the size of DCI format 3_1.
Optionally, if the UE is configured to monitor DCI format 3_0, then the "size of DCI format 3_0/3_1" refers to the size of DCI format 3_0 (for example, according to the definition of DCI format 3_0 and DCI format 3_1, the size of DCI format 3_1 is always less than (or less than or equal to) the size of DCI format 3_0, and therefore DCI format 3_0 can be used as a reference size for a further DCI size alignment operation as long as the UE is configured to monitor DCI format 3_0).
Optionally, if the UE is configured to monitor DCI format 3_1, then the "size of DCI format 3_0/3_1" refers to the size of DCI format 3_1 (for example, according to the definition of DCI format 3_0 and DCI format 3_1, the size of DCI format 3_0 is always less than (or less than or equal to) the size of DCI format 3_1, and therefore DCI format 3_1 can be used as a reference size for a further DCI size alignment operation as long as the UE is configured to monitor DCI format 3_1).
Optionally, due to a DCI format alignment operation, $D_{3031}$ may vary in different steps (or sub-steps, or sub-sub-steps, or sub-sub-sub-steps).
Optionally, $D_{3031}$ exists only if the UE is configured to monitor DCI format 3_0 or the UE is configured to monitor DCI format 3_1.
Optionally, the execution order of step S101-0 (if present), step S101-1 (if present), step S101-2 (if present), step S101-3 (if present) and step S101-4 (if present) can be adjusted in any manner.
Optionally, respective points-in-time for step S101-0 and/or step S101-1 and/or step S101-2 and/or step S101-3 and/or step S101-4 can be determined in any one of the following manners:
After step 2 ends and before step 3 starts (for example, if step 2A is not present).
After step 2A ends and before step 3 starts.
After the step (or sub-step or sub-sub-step or sub-sub-sub-step) immediately preceding step 3 ends and before step 3 starts.

After step 4 ends.

After step 4A ends (for example, if step 4B is not present).

After step 4B ends.

After a "DCI size alignment procedure" ends.

Optionally, step S101-0 and/or step S101-1 and/or step S101-2 and/or step S101-3 and/or step S101-4 may be performed one or more times.

In addition, in step S103, DCI is received. For example, DCI is received according to one or more DCI formats in the set S of DCI formats.

Optionally, in Embodiment 1 of the present invention, when applicable (for example, for a certain DCI format or a certain number of DCI formats), the word "configured" in the expression "UE is configured to monitor DCI format X" can be replaced with "pre-defined".

Optionally, in Embodiment 1 of the present invention, when applicable (for example, for a certain DCI format or a certain number of DCI formats), the word "configured" in the expression "UE is configured to monitor DCI format X" can be replaced with "pre-configured".

Therefore, according to the disclosure of Embodiment 1, the present invention provides a method that improves a DCI size alignment procedure, such that UE can efficiently and unambiguously determine a size of DCI related to 5G V2X.

Variant Embodiment

Figure 2:
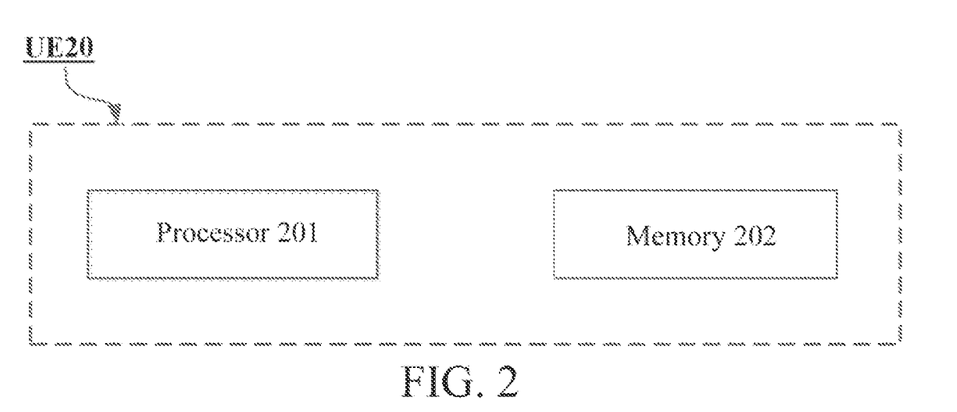
FIG. 2 shows a block diagram of user equipment (UE) involved in the present invention.

Hereinafter, FIG. 2 is used to illustrate user equipment that can perform the method performed by user equipment described in detail above in the present invention as a variant embodiment. FIG. 2 is a block diagram showing the user equipment (UE) involved in the present invention. As shown in FIG. 2, user equipment (UE) 20 includes a processor 201 and a memory 202. The processor 201 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. The memory 202 stores program instructions. The instructions, when run by the processor 201, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments. Those skilled in the art should understand that part of or all of mathematical expressions or mathematical equations or mathematical inequalities may be simplified (for example, incorporating constant terms) or transformed or rewritten to some extent. Mathematical expressions or mathematical equations or mathematical inequalities before and after the simplification or transformation or rewriting may be considered to be equivalent to each other.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the term "base station" may refer to a mobile communication data and control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes, and/or other data structures provided or encoded on a computer readable medium such as an optical medium (for example, a CD-ROM), a floppy disk, a hard disk, or the like, or other media such as firmware or micro codes on one or more ROM or RAM or PROM chips, or a downloadable software image, a shared database, and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention is illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment (UE), characterized by-comprising:
a processor; and
a memory coupled to the processor and storing one or more instructions which, when executed by the processor, cause the UE to:
perform a first downlink control information (DCI) size alignment procedure for a first set of DCI formats, wherein, if at least one of DCI format 3_0 and DCI format 3_1 is configured to be monitored on a cell, the first set of DCI formats includes all DCI formats configured for the cell other than the at least one of DCI format 3_0 and DCI format 3_1; and
perform a second DCI size alignment procedure for the at least one of DCI format 3_0 and DCI format 3_1 if the at least one of DCI format 3_0 and DCI format 3_1 is configured to be monitored on the cell,
wherein
in the second DCI size alignment procedure, the one or more instructions, when executed by the processor, further cause the UE to, if a) both of the DCI format 3_0 and DCI format 3_1 are configured to be monitored on the cell and b) a number of information bits in one of DCI format 3_0 and DCI format 3_1 is less than a payload size of the other one of the DCI format 3_0 and DCI format 3_1, append zeros to the one of DCI format 3_0 and DCI format 3_1 until a payload size equals that of the other one of the DCI format 3_0 and DCI format 3_1, and
in the second DCI size alignment procedure, the one or more instructions, when executed by the processor, further cause the UE to append zeros to the at least one of DCI format 3_0 and DCI format 3_1 until a payload size of the at least one of DCI format 3_0 and DCI format 3_1 equals the smallest size in the first set of DCI formats that is larger than the at least one of DCI format 3_0 and DCI format 3_1.

2. A method performed by a user equipment (UE), the method comprising:
performing a first downlink control information (DCI) size alignment procedure for a first set of DCI formats, wherein, if at least one of DCI format 3_0 and DCI format 3_1 is configured to be monitored on a cell, the first set of DCI formats includes all DCI formats configured for the cell other than the at least one of DCI format 3_0 and DCI format 3_1; and
performing a second DCI size alignment procedure for the at least one of DCI format 3_0 and DCI format 3_1, if the at least one of DCI format 3_0 and DCI format 3_1 is configured to be monitored on the cell,
wherein
in the second DCI size alignment procedure, if a) both of the DCI format 3_0 and DCI format 3_1 are configured to be monitored on the cell and b) a number of information bits in one of DCI format 3_0 and DCI format 3_1 is less than the a payload size of the other one of the DCI format 3_0 and DCI format 3_1, appending zeros to the one of DCI format 3_0 and DCI format 3_1 until a payload size equals that of the other one of the DCI format 3_0 and DCI format 3_1, and
in the second DCI size alignment procedure, appending zeros to the at least one of DCI format 3_0 and DCI format 3_1 until a payload size of the at least one of DCI format 3_0 and DCI format 3_1 equals the smallest size in the first set of DCI formats that is larger than the at least one of DCI format 3_0 and DCI format 3_1.

* * * * *